United States Patent [19]

Dawson

[11] Patent Number: 5,201,904
[45] Date of Patent: Apr. 13, 1993

[54] TORQUEING TOOL

[76] Inventor: Ralph E. Dawson, 277 Camby Dr., Kingsport, Tenn. 37664

[21] Appl. No.: 864,672

[22] Filed: Apr. 7, 1992

[51] Int. Cl.⁵ .......................... B25G 1/00; B25B 13/06
[52] U.S. Cl. ................................. 81/177.2; 81/177.6; 81/124.4
[58] Field of Search ................ 81/177.2, 177.1, 177.6, 81/177.85, 462, 180.1, 489, 124.3, 124.6, 124.7

[56] References Cited

U.S. PATENT DOCUMENTS

| | | | |
|---|---|---|---|
| 1,396,850 | 11/1921 | Klingbeil | 81/177.2 X |
| 2,313,743 | 3/1943 | Grau et al. | 81/462 |
| 2,702,488 | 2/1955 | January | 81/489 X |
| 4,070,931 | 1/1978 | Florko | 81/177 B |
| 4,344,340 | 8/1982 | Erickson | 81/177.2 |
| 4,537,101 | 8/1985 | Eversole | 81/180.1 |
| 4,829,856 | 5/1989 | Reynolds | 81/52 |
| 4,972,742 | 11/1990 | Brown | 81/462 |

FOREIGN PATENT DOCUMENTS 3705415 10/1987 Fed. Rep. of Germany ... 81/177.85

Primary Examiner—D. S. Meislin
Attorney, Agent, or Firm—William P. Heath, Jr.

[57] ABSTRACT

A device for applying torque to a rotatable workpiece. The device is particularly constructed to loosen or tighten nuts or bolts which are difficult to turn due to rust, corrosion or the like. The device multiplies force (torque) that is applied to the handle of the device to a workpiece to be rotated thereby enabling a person to apply a relatively light force to the device and deliver a multiple of the force applied to the rotatable workpiece. The device of the invention is constructed so that it may be partially disassembled and folded to be conveniently stored until needed.

6 Claims, 2 Drawing Sheets

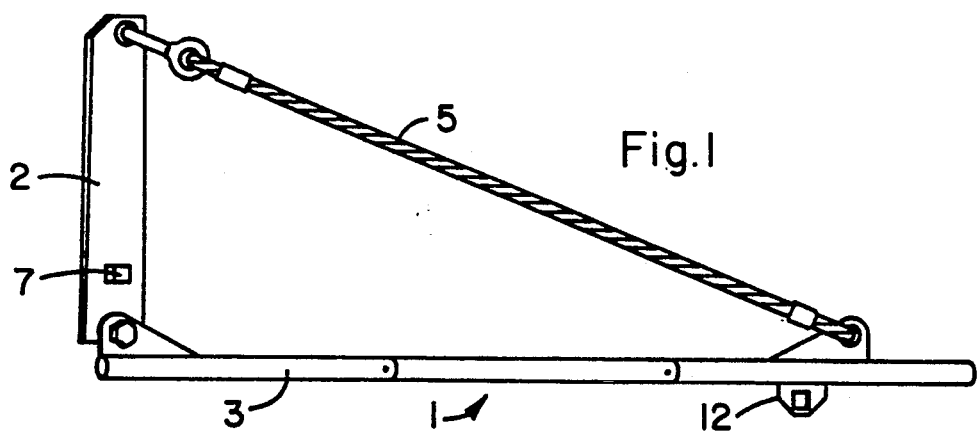
Fig. 1
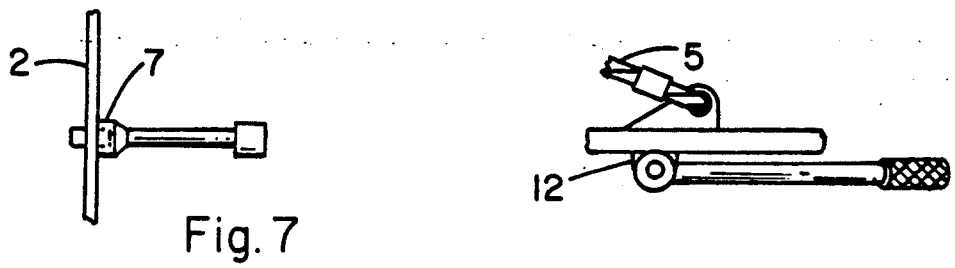
Fig. 7
Fig. 2
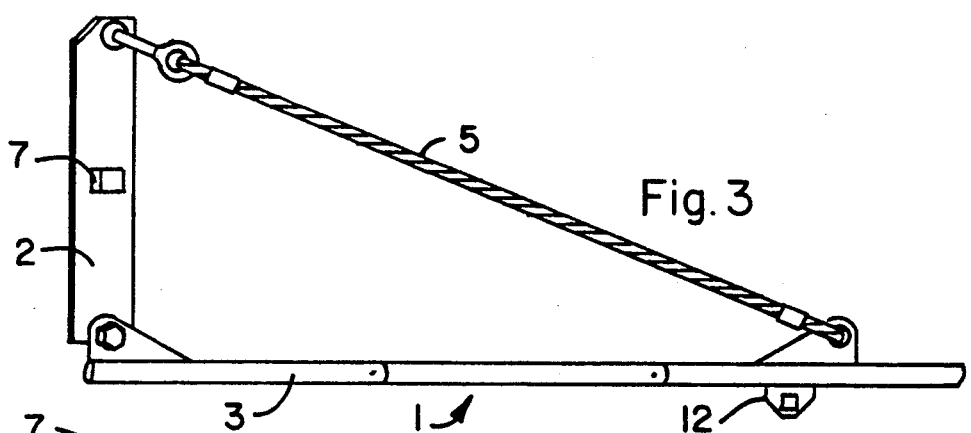
Fig. 3
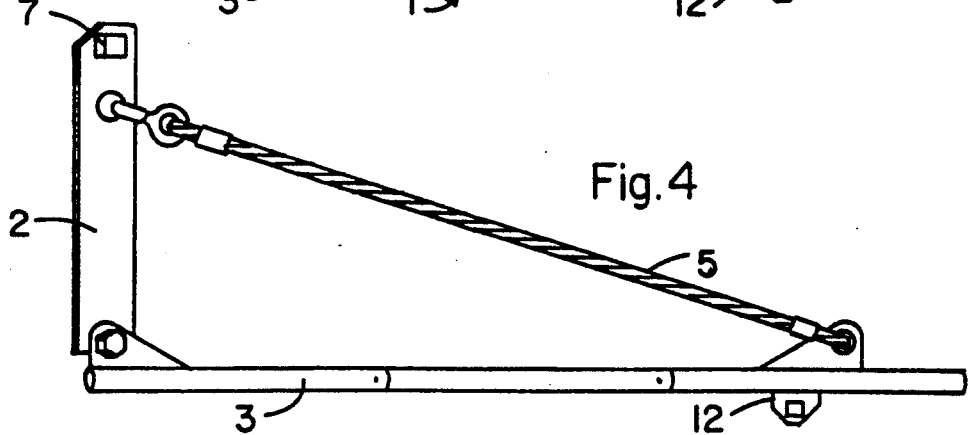
Fig. 4

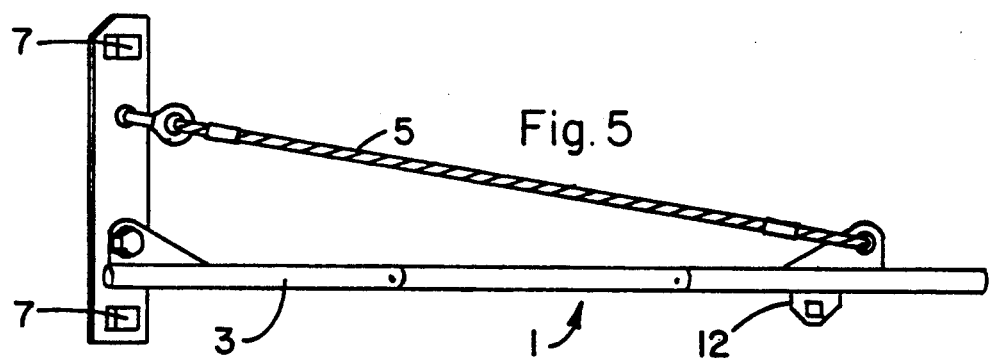
Fig. 5
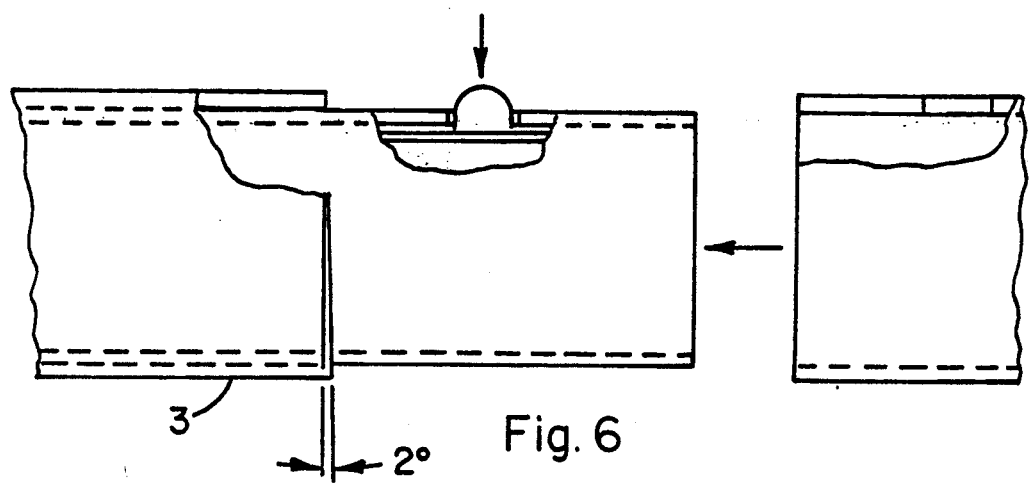
Fig. 6
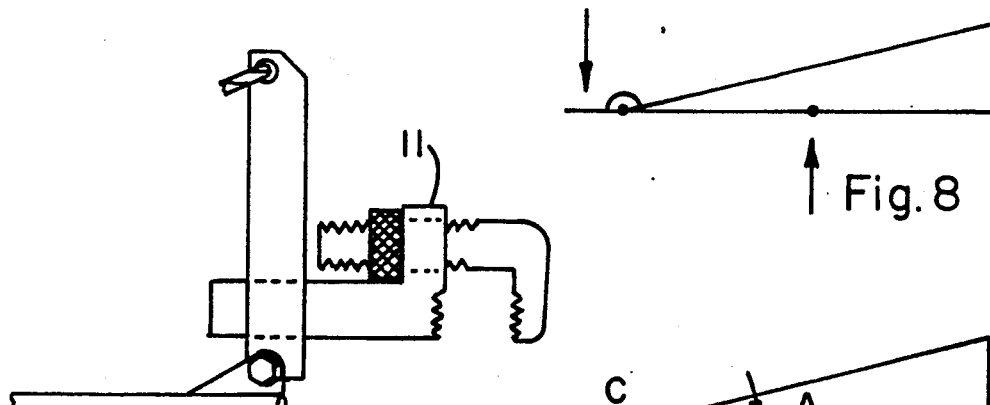
Fig. 8
Fig. 9
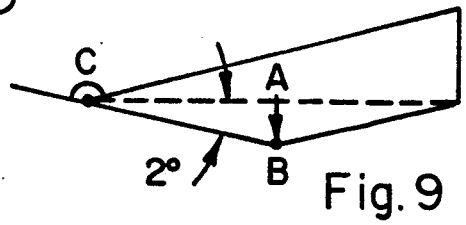
Fig. 12
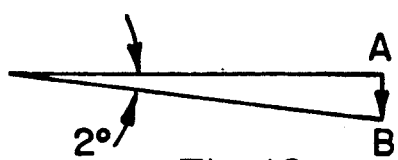
Fig. 10
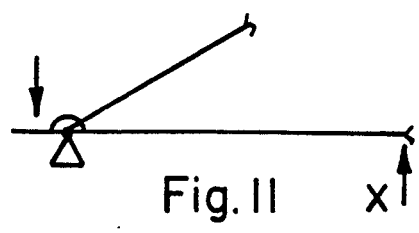
Fig. 11

TORQUEING TOOL

FIELD OF THE INVENTION

A device for applying torque to a rotatable workpiece. The device is particularly constructed to loosen or tighten nuts or bolts which are difficult to turn due to rust, corrosion or the like. The device multiplies force (torque) that is applied to the handle of the device to a workpiece to be rotated thereby enabling a person to apply a relatively light force to the device and deliver a multiple of the force applied to the rotatable workpiece. The device of the invention is constructed so that it may be partially disassembled and folded to be conveniently stored until needed.

The device has great utility when used to remove lug nuts from automobile wheels, especially when one experiences a flat tire on the road. Often when automobile tires are installed or changed at service stations or tire markets, the lug nuts are tightened with impact tools. This method usually results in the lug nut being tightened to a degree such that considerable force or torque is required to loosen the lug nut in order to change a tire on the road. With the device of the invention the task of changing a tire on the road is greatly simplified. The device is particularly useful for senior citizens, teenagers, and others who do not possess great physical strength. The device may be constructed in several sizes and of relatively lightweight materials or be made of heavier materials and made longer for use in more demanding situations such as on tractor trailers, farm equipment, military equipment such as tanks and heavy construction equipment.

DESCRIPTION OF THE PRIOR ART

Prior art devices for helping in the removal of lug nuts from automobile wheels are shown in U.S. Pat. Nos. 4,537,101; 4,829,856; 4,972,742; and 4,070,931. Each of the above identified patents discloses lug nut removal devices which aid the user of the device to apply force to a lug nut for the loosening thereof. The prior art patents cited focus on structures which aid the user in applying force and use a simple conventional lever arm to apply force.

SUMMARY OF THE INVENTION

This invention is a device for applying torque to a rotatable workpiece for loosening or tightening thereof, the device comprising a tool receiving member, preferably in the form of an elongated member and hereinafter for ease of description referred to as such, a tension transmitting member, tool reception means associated with said elongated member, and a compression transmitting member, the compression transmitting member being attached adjacent one of its ends to said elongated member adjacent one end of the elongated member the tension transmitting member being attached to the elongated member adjacent the opposite end thereof to which said compression transmitting member is attached, and the tension transmitting member and the compression transmitting member are operatively connected adjacent the respective free ends thereof, whereby the elongated member, the tension transmitting member, and the compression transmitting member define generally a triangle. The elongated member is preferably generally flat and is generally rectangular with the ends being one at each short side of the rectangle defined by said elongated member. The compression transmitting member is preferably comprised of at least two tubular pipe sections loosely and removably connected end to end. The compression transmitting member and the tension transmitting member have associated therewith means to receive force adjacent the point of their attachment to each other.

Preferably the compression transmitting member is comprised of three tubular pipe sections, the ends of the middle connecting tubular pipe ends are beveled about 1° or 2° whereby when force is applied to said force receiving means in a plane in which said triangle defined by the device lies and in a manner that puts tension on the tension transmitting means the device will rotate in a plane perpendicular to an axis passing through the tool reception means 7 located on said elongated member. The force receiving means may be a handle located on the free end of the compression transmitting means.

The force receiving means may be adapted to receive a torque wrench such as a flange 12 having an opening for receiving the socket attachment extension on a torque wrench whereby a selected amount of torque can be applied to the workpiece as shown in FIG. 2. The tool reception means 7 may be associated with the elongated member intermediate the short sides of the rectangle defined by the elongated member. Also the tool reception means 7 may be mounted on said elongated member within the triangle defined by the device. However the device will function when one or both of the short side ends of the elongated member extend beyond the attachment point thereof to the tension transmitting member or the compression transmitting member and the tool reception means 7 is located on the portion of the elongated member lying outside the triangle defined by the device.

The above-described invention comprises the features of construction, combination of elements and arrangement of parts which will be more fully exemplified as hereinafter set forth.

BRIEF DESCRIPTION OF THE DRAWINGS

In the accompanying drawings which form a part of the specification and are to be read in conjunction therewith and in which like reference numerals are used to indicate like parts in the various views.

FIG. 1 is a side view of the device of my invention;

FIG. 2 is a fragmentary side view of the device illustrating the use of a torque wrench with the device;

FIG. 3 is a side view of a modification of the device showing an alternative location of the tool receiving means;

FIG. 4 is a side view of yet another modification of the device showing another location of the tool receiving means;

FIG. 5 is a side view of a further embodiment of the device showing different locations of the tool receiving means on the device;

FIG. 6 is a fragmentary view showing details of a coupling useful to assemble the device for use;

FIG. 7 is a fragmentary view showing an extension and a socket mounted on the tool receiving member of the device;

FIGS. 8 through 11 are force diagrams; and

FIG. 12 is a diagramatic view of the device further depicting a conventional wrench mounted and secured by tool reception means.

DETAILED DESCRIPTION OF THE PREFERRED EMBODIMENT

With reference to the drawings the present invention is directed to a device for applying torque to a rotatable workpiece for loosening or tightening thereof. In FIG. 1 there is shown an embodiment of the device 1 which is adapted to receive a socket wrench or other wrench which commonly is used to remove or install lug nuts of the type that commonly secure wheels on vehicle axles. The device has an elongated member 2 which typically is a rectangular bar that is about one-fourth the length of the compression transmitting member 3. However, the ratio of the length of the bar to the length of the compression transmitting member can be in any desired ratio so long as the structural strength of the components exceeds that of the forces applied during use of the device.

The elongated member 2 is pivotally or otherwise connected to the compression transmitting member 3 and the tension transmitting member 5 is connected to the elongated member 2 adjacent the end of the elongated member that is not connected to the compression transmitting member. The tension transmitting member 5 is also attached to the compression transmitting member 3 near the end not attached to the elongated member 2. These three components of the device generally define a triangle. The tension transmitting member 5 is preferably a cable; however, a tube, bar, rod, or the like, of sufficient strength would be operative. In the preferred embodiment I choose to use a cable as the tension transmitting member due to the inherent flexibility of a cable. The compression transmitting member 3 is preferably made of lightweight tube stock constructed so that the pieces, usually three, can be assembled end to end to construct the compression transmitting member.

Preferably the ends of the tube stock that comprise the compression transmitting means are sized to permit a loose fit and preferably are beveled about 1° or 2° as shown in FIG. 6. The advantage in having the joining ends of the tubes comprising the compression member is to help balance the force produced by pushing or pulling on the handle.

When the tool is being used the point where the tension member 5 is attached to the compression member acts as a pivot point between the force supplied to the handle and the resultant force at the joint of the compression member is as shown in FIG. 8.

The compression force is determined as a straight line between the compression member and tension member joint to the compression member and elongated member joint. In the diagram shown in FIG. 8 the compression force is 400 pounds per 100 pounds of "push" force applied to the handle (ratio 4:1).

If the compression is not straight, a vector force will result as shown in FIG. 9 as AB vector force.

The calculation of the resultant force shown as AB with 400 pounds of compressive force on CA is as follows:

$$\tan 2° = \frac{AB}{400 \text{ lbs.}}$$

$$.035 = \frac{AB}{400 \text{ lbs.}}$$

$$AB = 13.97 \text{ lbs.}$$

The force upward on the compression member at a point 24 inches away from the point of attachment of the tension member and the compression member when 100 pounds of force is applied to the handle three inches from the point of attachment to the handle is calculated as follows and as illustrated in FIG. 11:

clockwise = counterclockwise $$(100 \text{ lbs.})(3'') = (24'')(X)$$

$$300 = 24X$$

$$X = 12.5 \text{ pounds}$$

The tubes comprising the compression transmitting member may be removably fastened together by use of conventional pushbutton fasteners wherein the pushbutton fastener is mounted in one tube and the second tube is provided with a hole in its sidewall to releasably receive the button as shown in FIG. 5. In use the end of the tube having the pushbutton fastener mounted therein would be inserted into the end of the tube having the hole for receiving the pushbutton.

The ends of the tubes where they contact when assembled may be beveled about 2° as shown in FIG. 6 to aid in the final alignment of the tubes of the compression member when force is being applied.

Normally when the device is assembled the loose fitting of the tubular member comprising the compression member will result in the compression member being slightly bowed away from said tension transmitting member as shown in FIG. 9. The opposing force, i.e. AB = 13.97 lbs. down vs. X = 12.5 lbs. up as described above tend to balance when the compression member is constructed so that the compression member is slightly bowed away from said tension transmitting member when the device is being used.

In FIG. 12 there is shown in a diagramatic sketch an arrangement wherein the handle of a conventional wrench 11, such as a pipe wrench, is received and secured to the elongated member 2 of the device of this invention. Obviously any conventional means can be used to receive the handle of a conventional wrench. For example, the wrench handle may be modified to mate with the elongated member in a side-by-side arrangement such as shown in FIG. 12. To further aid in the mating, the elongated member and the modified tool handle may be provided with fastening means such as a bolt passing through both to hold the pieces in position. Obviously one could weld the two pieces together.

It is noted that the arrangement of parts set forth in FIG. 12 will move the rotational axis of the device of this invention to the jaws of the conventional wrench thereby effecting a lengthening of the lever arm and thus increasing torque put on the workpiece. While I have described only one possible way of attaching a wrench handle to the elongated member, I do recognize that many known and obvious attachment arrangements may be used.

From the foregoing it will be seen that this invention provides a useful, portable device for the application of torque for removal or installation of nuts or bolts and the like which are difficult to turn.

Although the illustrated embodiments of this invention have been described in great detail, it should be apparent that certain modifications, changes, and adaptations may be made in the illustrated embodiments and it is intended to cover all such modifications, changes, and adaptations which come within the scope and spirit of the present invention.

What is claimed is:

1. A device for applying torque to a rotatable workpiece for loosening or tightening thereof, said device comprising a tool receiving member having opposite sides, an elongated tension transmitting member, tool reception means located on said tool receiving member and a compression transmitting member, said compression transmitting member being comprised of at least two tubular sections loosely connected to each other in an end-to-end relationship, said compression transmitting member being pivotally attached at one end thereof to said tool receiving member at one of said opposite sides and to said tension transmitting member adjacent its opposite end to provide means to receive force, at least one of said loosely connected ends of said compression transmitting member is beveled at least about 1° to permit the compression member to be slightly bowed away from said tension transmitting member when the device is being used to aid in the final end-to-end alignment of the tubes when force is being applied, said tension transmitting member being moveably attached to said tool receiving member at the other of said opposite sides, the tool receiving member, the tension transmitting member and the compression transmitting member define generally a triangle and all lie generally in the same plane, whereby when a torque moment force is applied to said means for receiving force, the torque moment force is converted to a compression force transmitted to said tool receiving member by said compression transmitting member and a tension force transmitted to said tool receiving member by said tension transmitting member to thereby cause the tool receiving member to rotate.

2. Device of claim 1 wherein said means to receive force is a handle located on eht end of said compression transmitting means.

3. Device of claim 1 wherein said means to receive force has mounted thereon means adapted to receive a torque wrench whereby a selected amount of torque can be applied to said workpiece.

4. Device of claim 1 wherein said tool receiving means is located on said tool receiving member intermediate the point of attachment of said tension transmitting member and said compression transmitting member.

5. Device of claim 1 wherein said least one portion of said tool receiving means extends beyond its attachment point to said tension transmitting means and said compression transmitting means and said compression transmitting means and said tool reception means is located outside the triangle defined by the device.

6. Device of claim 1 wherein the tool is a wrench mounted on said tool receivign member, whereby force applied to the means for receiving force will be transmitted to workpiece engaging portion of the tool.

* * * * *